United States Patent [19]

Sauter

[11] Patent Number: 5,218,654
[45] Date of Patent: Jun. 8, 1993

[54] GRIN ROD LENS OPTICAL BACKPLANE BUS

[75] Inventor: Gerald F. Sauter, Eagan, Minn.

[73] Assignee: Unisys Corporation, Blue Bell, Pa.

[21] Appl. No.: 869,430

[22] Filed: Apr. 16, 1992

[51] Int. Cl.$^5$ .............................................. G02B 6/28
[52] U.S. Cl. ........................................ 385/24; 385/34; 385/44; 359/163; 359/173
[58] Field of Search ..................... 385/24, 34, 31, 44, 385/45, 46, 48; 359/154, 159, 163, 173, 188, 195

[56] References Cited

U.S. PATENT DOCUMENTS

| | | | |
|---|---|---|---|
| 4,208,094 | 6/1980 | Tomlinson, III et al. | 385/18 |
| 4,239,330 | 12/1980 | Ashkin et al. | 385/22 |
| 4,701,011 | 10/1987 | Emkey et al. | 385/34 |
| 4,817,205 | 3/1989 | Asawa | 359/116 |
| 4,880,289 | 11/1989 | Imoto et al. | 385/24 |
| 5,050,954 | 9/1991 | Gardner et al. | 385/16 |

OTHER PUBLICATIONS

Cefarelli, F. P., Evans, R. T., Optical Circuit Module Connector, *IBM Technical Disclosure Bulletin*, vol. 21, No. 4, Sep. 1978.

*Primary Examiner*—Frank Gonzalez
*Attorney, Agent, or Firm*—Glenn W. Bowen; Mark T. Starr

[57] ABSTRACT

GRID rod lenses extend between the faces of beam-splitting prisms that are in the transmitting and receiving light beam paths of an optical backpanel bus. The GRIN rod lenses are secured in segments to the inner opposing faces of pairs of beam-splitting prisms along the light beam paths with optical grade epoxy in order to reduce undesirable reflections when vibrations occur. These GRIN rod lenses are contained in a Kovar channel which has a pair or elongated V-shaped grooves. Kovar is the preferred material because it has approximately the same index of expansion as the GRIN rod lenses. The GRIN rod lenses of the transmitting path are secured in one V-shaped groove while the GRIN rod lenses of the receiving path are secured in another V-shaped groove. GRIN rod lenses that run normal to the transmitting and receiving light paths are also secured with optical grade epoxy to the beam-splitting prisms and are coupled to optical transmitters and receivers through optical fibers to complete the light path from any transmitter on the bus to any receiver. A plurality of smaller diameter GRIN rod lens can be coupled to the larger diameter transmitter and receiver coupling GRIN rod lens that run normal to the transmitting and receiving path so that a number of optical fibers may be coupled to each normally disposed GRIN rod lenses. This allows the same transmitting and receiving paths to be shared by a number of light signals.

8 Claims, 4 Drawing Sheets

GRIN ROD LENS OPTICAL BACKPLANE BUS

TECHNICAL FIELD

The present invention relates to optical data buses for data communication. More specifically, the invention relates to an optical backplane bus that utilizes GRIN rod lenses and beam splitters as optical taps for coupling optical signals between optical transmitting and receiving elements that are carried by removable cards that are plugged into a backplane board.

BACKGROUND ART

Information signals are commonly exchanged between circuit cards in data processing equipment and a backplane board into which transmitting and receiving elements are plugged. Conventional backplanes utilize electrical interconnections to complete the communication paths that run between the receivers and transmitters of different processors. As long as data rates are relatively low, or the paths are massively parallel, electrical connections can provide satisfactory communication. However, as data rates increase, problems begin to appear due to cross-talk, skew, rf interference, losses, ground-loop isolation, impedance mismatch and latency. The exact data rate where these problems become critical varies with the application, but it often will occur at data rates between 10 MHz and 100 MHz. Between the upper and lower data rates of this range, it is possible to employ either an electrical backplane or an optical backplane for board-to-board communication links. Proposed Pi and Futurebus+ data busses are intended to operate within this range.

In order for an optical backplane to be advantageously used in place of a traditional electrical backplane, it must be competitive in cost, it must not be overly complex and it must offer future growth potential. Optical backplane designs are generally one of two types. They are of either a guided or a free-space design. The guided method may be accomplished either through optical fibers or through integrated optic waveguides. The free-space approach can be achieved either through microoptic elements or through a holographic lens systems. Some of the general advantages and disadvantages of each method are described below.

Guided Methods. The use of optical fibers for card-to-card communications typically requires a number of expensive transmitters and receivers, as well as fiber-to-fiber connections. Optical fibers must maintain alignment under all environmental conditions, including especially temperature and vibration. Arrangement of the optical fibers into a bus architecture will minimize the number of transmitters and receivers needed, but a fiber optic alignment will still be required. In addition, fiber optic bus architecture usually utilizes either a star-type configuration or a bus structure with a number of optical taps. Splitting losses on such a bus can unfavorably limit the number of cards that can be used with the bus.

Embedding optical fibers into an electrical backplane poses a compatibility problem and often requires that the fiber optics be formed into tight turns which can damage the fibers and are difficult to implement. The use of optical fibers also often involves labor-intensive preparation and fusion or mechanical splicing of the ends of the fibers.

IBM Technical Disclosure Bulletin, Vol. 21, No. 4, Sep., 1978, illustrates one example of an optical circuit module connector in which fiber optics communicate with a mix of optical and electrical components that are packaged upon a conventional card-on-board environment. Light-emitting-diodes (LEDs) or photodiodes are placed on a substrate that is mounted at right angles to the circuit modules, and the optical fiber connector carries the optical fibers into alignment with the LED or photodiodes.

Integrated waveguides are another way to provide guided wave communication which have the advantages of being fabricatable by batch methods, and they are rugged and can withstand relatively high temperatures. Some integrated waveguide implementations, however, are not designed for use with bus architecture, but rather they rely on parallel data flow. For bus operation either integrated taps or star couplers that are superior to the presently available taps or couplers must still be developed to provide practical integrated waveguide bus architectures.

Integrated waveguide development has generally been directed to massively parallel computing systems in which there are a multitude of parallel interconnection paths between processors on the same card rather than to card-to-card communication. This effort has resulted in the development of low-loss polymer waveguides with cross-overs, right-angle bends and connections to transmitters or receivers. Such devices at the present time still have excessive signal losses.

Free Space. There are several approaches that utilize free-space communication between cards. One such method uses optical-to-electrical relays at each board. The signal is converted to an optical signal and is sent to an adjacent card where it is converted to an electrical signal for use at that card. If it is to be transmitted further, another electrical-to-optical conversion is made and the data is sent to the next card. The disadvantages of this system include (1) the data may be corrupted by the number of electrical-to-optical and optical-to-electrical conversions that must be made, and (2) a clear path must be maintained in the card stack for data transmission for each clear channel.

Holographic lenses have been used for diffracting a beam to a number of receivers, but this type of lens is critically dependent upon the laser frequency. A very precisely controlled signal frequency over the entire temperature range of operation is required in order for the optical transmitter to work with the holographic lens.

Graded-index (GRIN) lenses are often used to couple one single mode optical fiber to another single mode optical fiber wherein a beam is launched by one GRIN lens that passes either through free space or through a combination of free space and an intervening optical element into another GRIN lens. In some cases the two GRIN lenses have been placed so the face of one GRIN lens abuts the face of the other GRIN lens. Examples that show the use of GRIN lens are found in U.S. Pat. No. 4,701,011, issued Oct. 20, 1987 to William Emkey, et al, entitled "Multimode Fiber-Lens Optical Coupler;" U.S. Pat. No. 4,817,205, issued Mar. 28, 1989 to Charles K. Asawa, entitled "Bimodal Optical Fiber Communication System Using Graded Index Fiber;-"U.S. Pat. No. 5,050,954, issued Sep. 24, 1991, entitled "Multiport Optical Devices" to William B. Gardner, et al; and in U.S. Pat. No. 4,239,330, entitled "Multiple Optical Switch," issued Dec. 16, 1980 to Arthur Ashkin, et al.

U.S. Pat. No. 4,208,094, issued Jun. 17, 1980, entitled "Optical Switch" in the name of Walter J. Tomlinson, III, et al., disclosed a GRIN lens and a rotator reflecting surface that was mounted adjacent to one surface of the lens at an angle. A plurality of optical fibers are positioned at the other end of the lens. Rotation of the reflecting surface about the axis of the lens changes the coupling of light between the input end and the output fibers. The output fibers are retained in alignment in a V-groove that was formed in a retaining block for the fibers.

GRIN lenses are optical glass rods which commonly have a radial refractive index gradient that approximates a parabolic function. Therefore, waves traveling through the center of the lens are the slowest, whereas waves traveling at a distance displaced from the center of the lens are propagated faster in proportion to the distance that they are from the center of the lens. In GRIN lenses the light beams are alternately collimated and focused at repetitive intervals as the beam advances through the lens.

A pitch of 1 for a GRIN rod lens is defined as the distance between three successive collimating planes or three successive focus points of a given light ray. GRIN lenses that are commonly used typically have a ¼ pitch which is the distance between a collimating plane and a focus point. This means that when a focused beam is applied to one end of the GRIN lens at a focus point, a collimated output beam will be supplied at the other end of the GRIN lens at a collimating plane, and conversely when a collimated beam is applied to one end of the GRIN lens at a collimating plane, a focused output will be supplied at the opposite end of the GRIN lens at the focus point. In this manner a focused beam from one optical fiber may be expanded into a collimated beam in one GRIN lens into the second GRIN lens, where it may be converted back to a refocused beam and directed to another optical fiber to complete the communication path.

GRIN lens are manufactured in the form of elongated GRIN rod lens segments which extend for a multiple number of pitch lengths. Since the GRIN rod lens is commonly employed as a ¼ pitch element, the GRIN rod lens segments are sliced in such elements for typical applications. In the present invention the GRIN rod lens segments are used to span the distance between the optical taps of an optical bus even though a multiple number of pitch lengths may be required of the GRIN rod lens segments.

SUMMARY OF THE INVENTION

The present invention is directed to an optical backplane bus which couples optical signals to a number of receiving elements and receives optical signals from a number of transmitting elements that are contained on cards plugged into an electrical backplane. The electrical backplane in the embodiment also contains a number of GRIN lenses, which may be of conventional ¼ pitch configuration, that are coupled to optical fibers to supply signals to the receivers and to receive signals from the transmitters.

The optical backplane bus includes a first set of transmitting GRIN rod lenses that are aligned along a first line that extends past the transmitters and receivers. A second set of receiving GRIN rod lens are positioned adjacent the first set and aligned to extend along a second line that is parallel to the first line. The receiving and transmitting GRIN rod lenses provide light paths between the optical taps which serve to direct light into the transmitting set of GRIN rod lenses from a set of transmitter coupling GRIN rod lenses and to direct light from the receiving set of GRIN rod lenses into a set of receiver coupling GRIN rod lenses. The coupling GRIN rod lenses are located in alignment with the receivers and transmitters. The optical taps consist of beam-splitting prisms which couple transmitted optical signals from the transmitters into the transmitting path of the GRIN rod lens segments so it passes through the last prism of the transmitting path to a reflector where the light beam is reflected back in the opposite direction into the GRIN rod lens set of the receiving path.

BRIEF DESCRIPTION OF THE DRAWINGS

The present invention is described by reference to the drawings in which.

DESCRIPTION OF THE PREFERRED EMBODIMENTS

Figure 1:
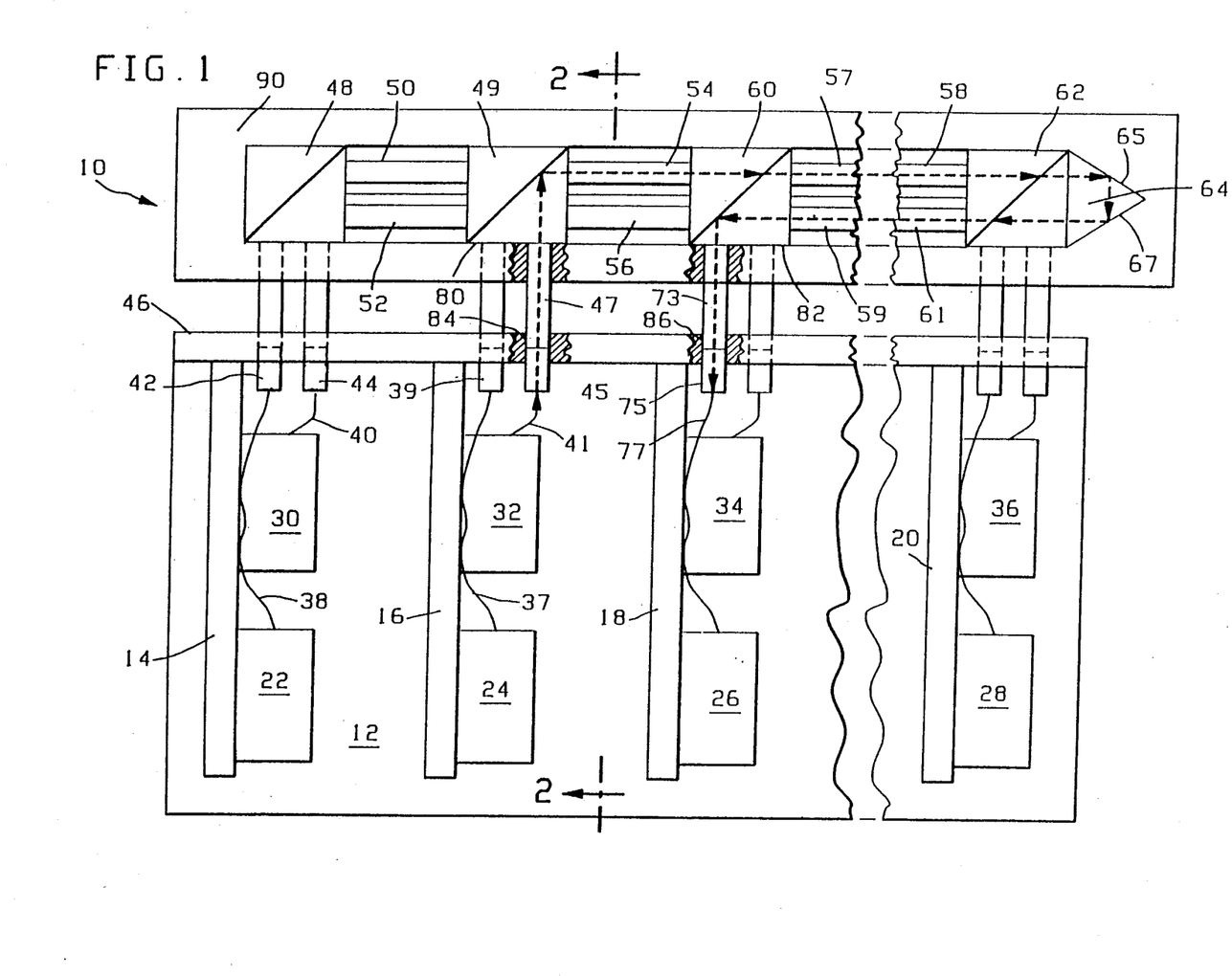
FIG. 1 is a top, partially broken view of an embodiment of the present invention in which a number of receiving and transmitting elements are mounted in cards which extend from the electrical backplane.

FIG. 1 shows an embodiment of the optical bus 10 of the present invention in which a large horizontally-disposed electrical circuit board 12 has a number of printed circuit cards vertically mounted on it. For illustration purposes, four cards 14, 16, 18 and 20 are shown in FIG. 1. The Figure is broken near the right end, to indicate that additional cards and bus elements may be present. Each of the printed circuit cards contains a receiving element 22, 24, 26 and 28, respectively, and a transmitting element 30, 32, 34 and 36, respectively. The transmitters and receivers are coupled through optical fibers to GRIN rod lenses which have a pitch of ¼ and are mounted on the board 12. For example, the optical fibers 38, 40 are coupled to the GRIN rod lenses 42, 44, respectively. Likewise, optical fibers 37, 41 are respectively coupled to GRIN rod lenses 39, 45. The optical fiber 38 is preferably a multi mode and the optical fiber 40 is preferably a single-mode fiber. The GRIN rod lenses 42, 44, 39, 45 preferably have a pitch of 0.25.

Figure 4:
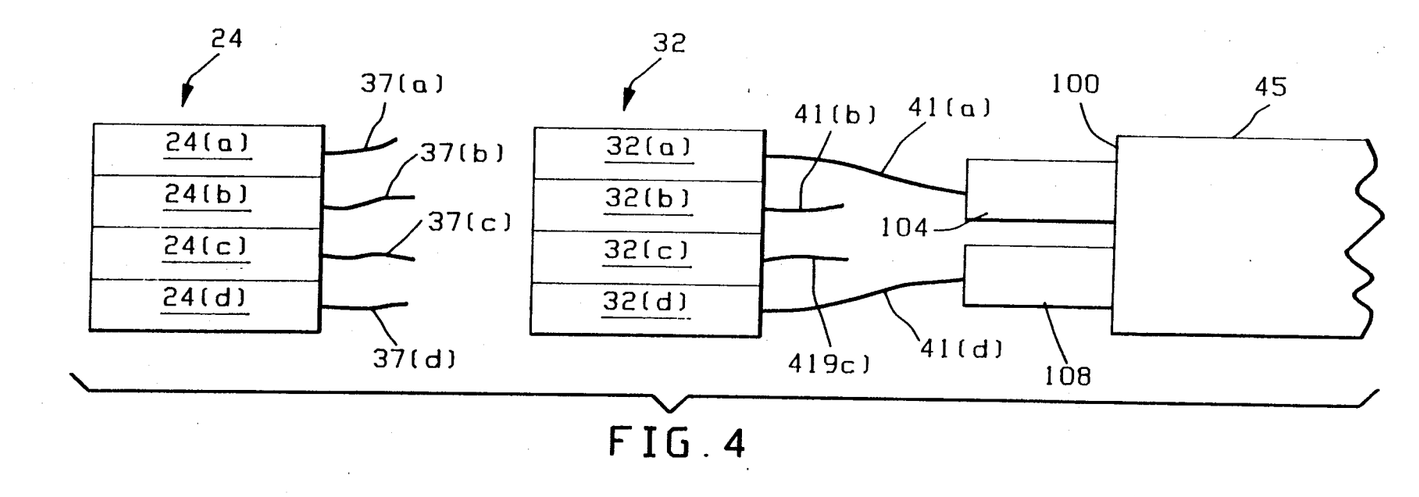
FIG. 4 is a partial expanded view of an alternate embodiment of FIG. 2 that shows a plurality of small diameter GRIN rod lenses that are glued to the end faces of larger diameter GRIN rod lenses in order to allow the coupling of a plurality of transmitter and receiver units to the same larger diameter GRIN rod lens.
Figure 5:
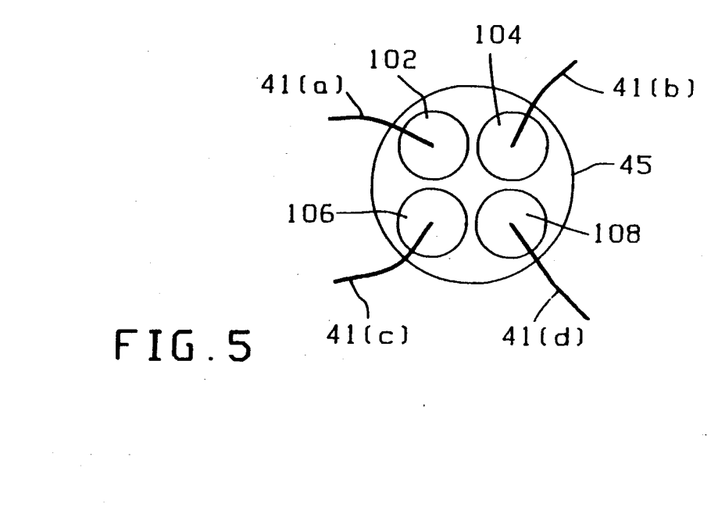
FIG. 5 is an end view of the larger diameter GRIN rod lens of FIG. 4 that is coupled to a plurality of transmitter units.
Figure 6:
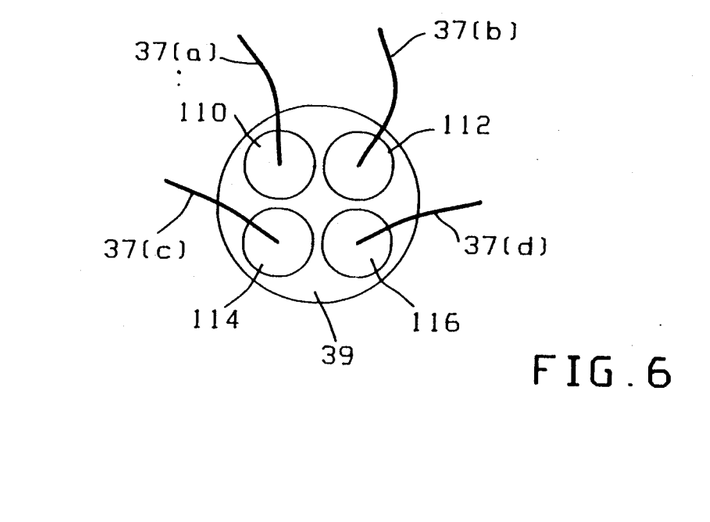
FIG. 6 is an end view of the larger diameter GRIN rod lens that is located behind the transmitter GRIN rod lens of FIGS. 4 and 5 which is coupled to a plurality of receiver units.

The arrangement of the transmitters and receivers, and the manner in which the GRIN lenses are coupled to the printed circuit cards, are not critical factors with respect to the present invention since many different types of arrangement and couplings are possible within the scope of the present invention. In addition, it is not essential that each GRIN lens be coupled through the optical fiber to a single transmitter since a number of optical fibers may be coupled from the GRIN lens to a number of transmitters or receivers, as shown in FIGS. 4–6.

The electrical backplane 46 for the bus system contains electrical wiring interconnections for the printed circuit cards 14–20 and extends in a vertical direction upwardly from the electrical circuit board 12. Aligned with each of the receiving/transmitter pair, such as the receiver 22 and the transmitter 30, are optical taps that are preferably formed by beam-splitting prisms, such as the prism 48. The GRIN rod lens segments 50, 54, 57 and 58, shown at the top line of FIG. 1, are displaced from the back of the electrical backplane 46 and provide a transmitting light path which proceeds from left-to-right, as shown in FIG. 1. The beam is sent into the transmitter 32, its connecting optical fiber 41 and its associated GRIN lens 45.

The light beam from the GRIN lens 45 is directed into the GRIN rod lens 47, which is aligned with the GRIN lens 45. GRIN rod lenses 45, 47 and 73, 75 may be secured together by optical grade epoxy glue, if desired. The beam then travels to the right through the beam-splitter 49 which directs the signal to the right into the GRIN rod lens segment 54. The transmitted beam next passes through the beam-splitting prisms 60, 62, any intermediate prisms and to a reflector prism 64. The angled prism wall 65 of the reflector prism 64 deflects the beam to the angled prism wall 67 which reverses the direction of the beam. The beam now proceeds right-to-left, as viewed in FIG. 1, into a receiving light path that includes the GRIN rod segments 52, 56, 59, and 61 and the beam-splitting prisms 48, 49, 60, and 62 and any intermediate prisms.

As the signal beam passes through beam-splitting prisms associated with the receivers, it is partially reflected into the receiving GRIN rod lenses, such as the GRIN rod lens 73. The GRIN rod lens 73 couples the beam to a receiving GRIN rod lens 75, and then to an optical fiber 77 and into the receiver 26. Point-to-point communication between any of the transmitters and any of the receivers along the bus can be achieved in this manner.

The length of the GRIN rod lens segments 50, 52, 54, 56, 57, 58, 59 and 61 are dependent upon the spacing between the pair of optical tap, beam-splitting prisms 49, 60 and 62 which are connected to each of these GRIN rod lens segments. Each pair of transmitting and receiving GRIN rod lenses, such as the GRIN rod lens segments 50 and 52 between the prisms 48 and 49, are of the same length as the illustrated embodiment. The length of the GRIN rod lens segments between other prisms may be different, according to the spacing of the transmitter-receiver pairs, but preferably the transmitters and receivers will be evenly spaced from each other.

The face of each GRIN rod lens that is adjacent to a prism, such as the left face of the GRIN rod lenses 50 and 52, are preferably glued directly to the right face of the prism 48 with an optical grade epoxy which does not adversely affect the optical characteristics of the transmitting and receiving paths. A number of suitable epoxies in use are well known to those skilled in the art, and are commercially available from Norland Products Inc., New Brunswick, NJ and other manufacturers. By gluing the GRIN rod lens segments to the prisms located at their opposite ends, unwanted reflections are reduced. The prisms may be encapsulated into a foam, an epoxy or plastic packing material to form a rigid structure (not shown), if desired. Material such as urethane foam and polystyrene may be used for such purpose.

Figure 3:
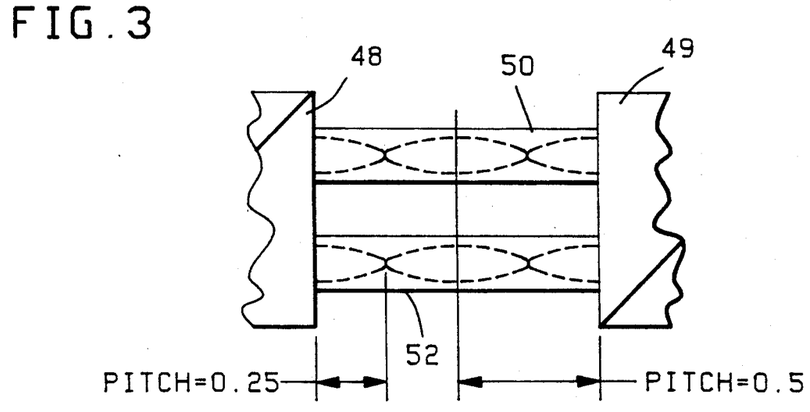
FIG. 3 is a partial expanded top view that shows light beams in a transmitting GRIN rod lens segment and an adjacent receiving GRIN rod lens segment that extend between two beam-splitting prisms.

The GRIN rod lenses of the transmitting and receiving paths run parallel to the electrical backplane 46, and each has a pitch of m(0.5) where m is an integer. FIG. 3, which is an expanded view of GRIN rod lenses 50, 52 and portions of prisms 48, 49 illustrate segments where m=2. That is, the entire segment for GRIN rod lenses 50, 52 has a pitch of 1.0. This means there are three collimated areas, one each at the prism faces and one in the middle of the GRIN rod lens segment. There are also two focus points. Pitches of 0.25 and 0.50 are illustrated relative to GRIN rod lens 52 in FIG. 3. A pitch of 0.25 or ¼ is seen to be the distance between a collimated area and a focus point for the beam.

Use of a pitch of m(0.5) for GRIN rod lenses 50, 52 insures that a collimated beam enters and leaves each of these rod lenses. This is significant because any divergence or misalignment of the beam will thereby be limited to the thickness of the beam-splitter prisms. The GRIN rod lens, such as 47 and 73, which respectively couple signals from such a transmitter 32 and to a receiver, such as receiver 26, are oriented normal to the transmitting and receiving path GRIN rod lens segments, and preferably also have a pitch of m(0.5), where m is an integer. They are also glued to the face of a beam splitting prism, such as the faces 80, 82, respectively. With a pitch of m(0.5), a collimated beam enters into, or leaves from, the GRIN rod lenses 47, 73, respectively.

Holes are provided in the backplane, such as holes 84, 86, which allow the normal GRIN rod lenses, such as 47 and 73, to pass through the backpanel 46 and into alignment with the 0.25 pitch GRIN rod lenses 45 and 75, respectively. It is to be noted that if the GRIN rod lenses 47 and 73 had a pitch of n where n was an odd integer, the GRIN lenses 44 and 42 could be removed and the optical bus could be assembled by passing the GRIN rod lenses 47 and 73 through the rods 84, 86 and by directly coupling the GRIN rod lenses 47 and 73 to the optical fibers 41 and 77, respectively.

Figure 2:
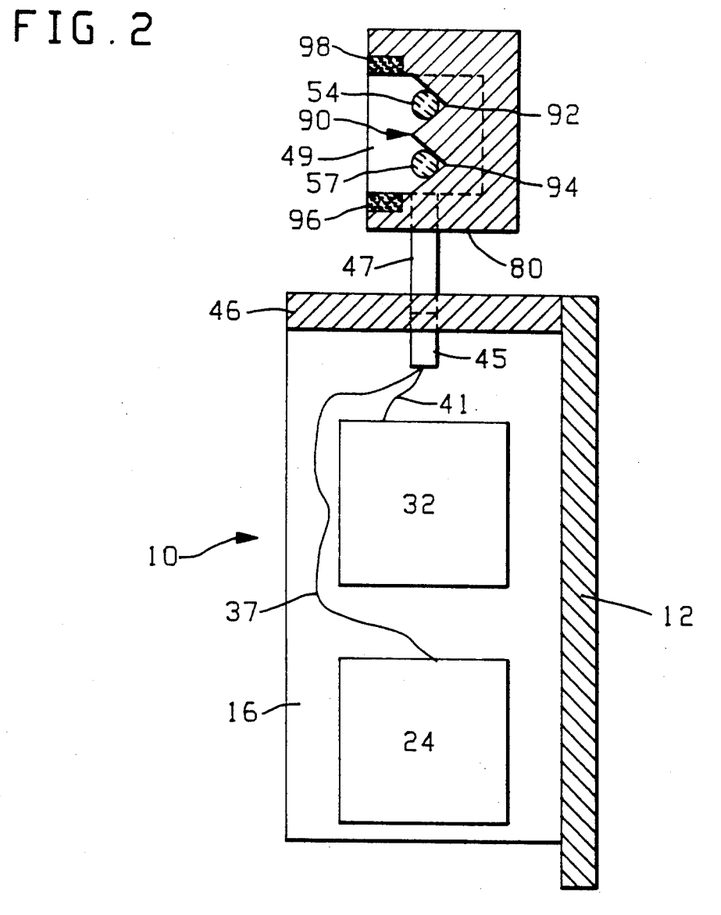
FIG. 2 is a cross-sectional view of FIG. 1 taken along the lines 2—2 of FIG. 1 which illustrates a Kovar channel that retains the transmitting and receiving GRIN rod lens segments in their own separate elongated V-shaped grooves.

The prisms and GRIN rod lenses of the transmitting and receiving paths are secured in a channel 90. A cross-sectional view of the channel 90 is shown in FIG. 2 which is taken along the line 2—2 of FIG. 1. The channel is preferably formed of Kovar which has an expansion coefficient that closely approximates the expansion coefficient of a GRIN rod lenses, and, therefore, the channel will not put excessive stress on the optical components during temperature changes. The cross-sectional view of FIG. 2 shows the cross-sections of GRIN rod lens 54 and 57. The GRIN rod lens 54 is supported in a V-shaped groove 92 and the GRIN rod lens segment 57 is supported in a V-shaped groove 94 which are formed in the Kovar channel 90. These V-shaped grooves hold the GRIN rod lenses in alignment with the beam-splitting prisms, and together the V- shaped grooves form a W-shaped retaining section. L-shaped grooves 96, 98 may be formed in the Kovar channel and filled with foam, epoxy or plaster material to form a more rigid structure (not shown), if desired.

FIGS. 4 and 5 show an alternate embodiment of the invention in which the receiving elements and the transmitting elements may be divided into a number of functional receiving and transmitting units. As shown in FIG. 4, the transmitter 32 may be subdivided into four separate transmitters 32(a), 32(b), 32(c) and 32(d). Likewise, a receiving element 24 may be subdivided into a number of identical receiving units, such as 24(a), 24(b), 24(c) and 24(d). The GRIN rod lens 45 typically has a cylindrical, cross-sectional area with a diameter on the order of 2 millimeters. A number of GRIN rod lenses with smaller circular, cross-sectional areas may be glued to the face 100 of the GRIN rod lens that faces the transmitting and receiving elements. These smaller diameter GRIN rod lenses have a pitch of 0.25 and have a diameter as small as 0.3 millimeters. A separate optical fiber is then connected between each of these smaller diameter GRIN rod lenses to one of the transmitting or receiving units.

In the illustrated example, FIG. 5 shows four smaller diameter transmitting GRIN rod lenses 102, 104, 106, 108. In FIG. 4 the optical fiber 41(a) is shown as coupling the GRIN rod lens 102 to the transmitting unit 32(a). Similarly, the optical fiber 41(d) is shown as coupling of the GRIN rod lens 108 to the transmitting element 32(a). The GRIN rod lenses 102 and 106, which are behind the GRIN rod lenses 104 and 108 in FIG. 4, are respectively coupled to the transmitting units 32(b) and 32(c) through the optical fibers 41(b) and 41(c).

The receiving GRIN rod lens 39 (FIGS. 1 and 6), which is located behind the GRIN rod lens 45, also has a corresponding number of smaller diameter GRIN rod lenses 110, 112, 114, 116 secured to its end face, as shown in FIG. 6. The GRIN rod lens 39 has the same number of corresponding smaller diameter GRIN rod lenses as the GRIN rod lens 45. Each of these will in turn be coupled through optical fibers, such as the optical fibers to the receiving unit 24(a)–24(d). The corresponding coupling optical fibers 37(a)–37(d) that originate in FIG. 6 are shown in FIG. 4 as terminating at their respective receiving unit.

In this manner the larger diameter GRIN lenses which provide the receiving and transmitting coupling paths, such as the GRIN rod lenses 45 and 47, may be used to carry a number of light beams. Each of these beams will be confined to a portion of the larger diameter GRIN rod lens which is associated with the smaller diameter GRIN rod lens that is glued to it. For example, if transmitting unit 32(a) were to couple a signal through the fiber 41(a) and the GRIN rod lens 104, this signal would be coupled along a path on the upper right-hand portion of the GRIN rod lens 45. The beam will maintain this relative position throughout the transmitting and receiving paths. Thus, if the receiver coupling GRIN rod lens 39 were to receive, the beam will be directed through the same relative upper right-hand portion of the GRIN rod lens 30, so that it will be coupled through the GRIN rod lens 112 to the receiving unit 24(a) through the optical fiber 37(a). Thus, the same bus transmitting and receiving paths may be used for coupling signals from a number of transmitting and receiving units.

Figure 7:
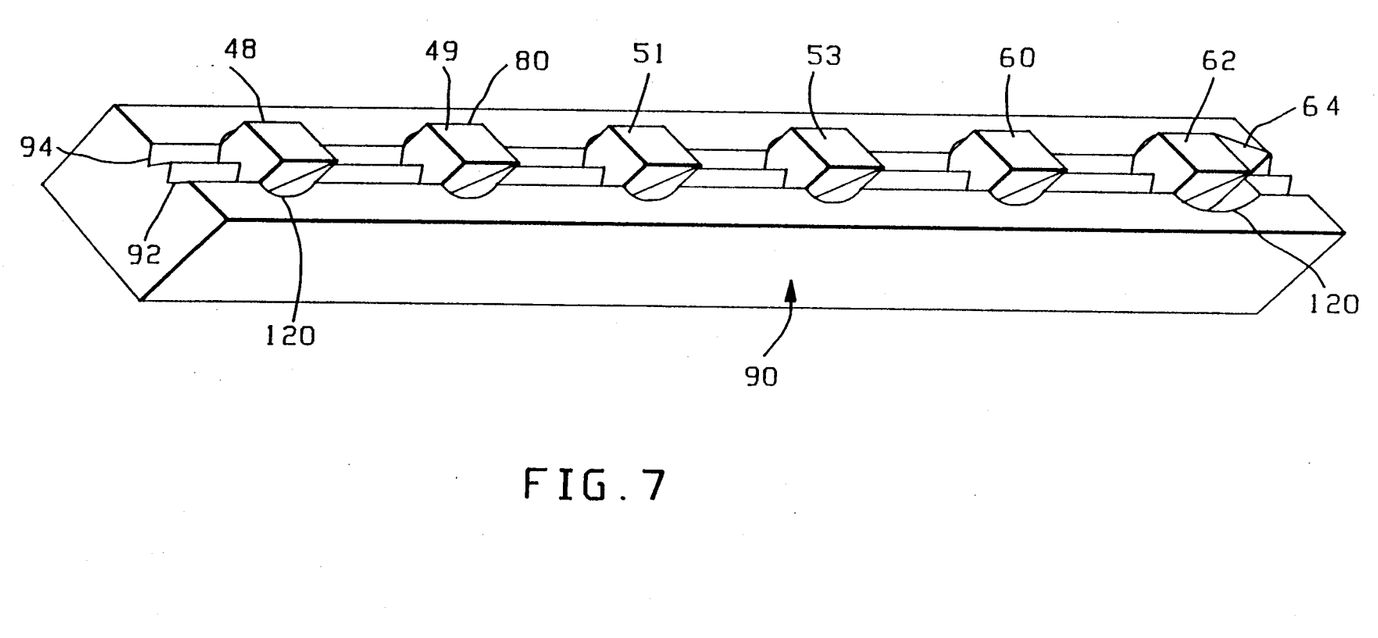
FIG. 7 is a perspective view of an alternate embodiment of the Kovar channel which is shown with the beam-splitting prisms and the end reflector positioned in recesses in the channel.

FIG. 7 is a perspective view which shows an alternate embodiment of the Kovar channel. In this configuration, the beam-splitting, optical-tap prisms, such as the prisms 48, 49, 51, 53, 60 and 62, are disposed in recesses 120. These beam-splitting prisms may be held in place by any suitable means, including epoxy or some type of conventional retaining mechanism (not shown) that is secured to the prism. The V-shaped grooves 92 and 94 which extend in a number of broken segments between pairs of prisms are best shown in FIG. 7. The GRIN rod lenses are not shown in FIG. 7 in order to more clearly depict the structure of the channel of this embodiment. The face 80 to which the GRIN rod lens 47 is coupled (FIG. 3) is shown in FIG. 7 to indicate the invention of the Kovar channel of this embodiment relative to the overall bus layout of FIG. 1.

What is claimed is:

1. An optical bus comprising:

a plurality of beam-splitting, optical-tap means constructed to allow a light beam to travel along a transmitting light path in a first direction through said optical-tap means, to travel along a receiving light path in the direction opposite to said first direction through said optical-tap means, to allow a portion of said light beam in said receiving light path to pass into an output light path that runs in a second direction which is substantially normal to said transmitting light path, and to allow an input light path that also runs in said second direction to provide a light beam to said transmitting light path, a first plurality of GRIN rod lenses which are aligned along said transmitting light path, a second plurality of GRIN rod lenses which are aligned along with receiving light path which is substantially parallel to said transmitting light path, wherein said GRIN rod lenses of both said first and said second pluralities of GRIN rod lenses have first and second ends and each are positioned such that one of said beam-splitting, optical-tap means abuts said first end, and another of said beam-splitting optical-tap means abuts said second end of each of said GRIN rod lenses, a plurality of receiving means and a plurality of transmitting means each of which are aligned with one said beam-splitting, optical-tap means, a first set of GRIN rod lenses each of which are associated with one of said receiving means, a second set of GRIN rod lenses each of which are associated with one of said transmitting means, each of said first and second sets of GRIN rod lenses being aligned with one of said beam-splitting, optical-tap means, and being positioned in abutment with the aligned one of said beam-splitting, optical-tap means such that light beams may pass through first set of said GRIN rod lenses into said optical-tap means for transmission along said transmitting light path, and such that light may pass through optical-tap means into said receiving means through said second set of GRIN lenses, wherein said GRIN rod lenses of said first and second pluralities of said GRIN rod lenses have a pitch of m(0.5) where m is an integer, and said first and second sets of said GRIN rod lenses comprise GRIN rod lenses which have a pitch of n(0.25) were n is equal to 3 or greater, and said optical bus further comprises, a first group of optical fiber means coupled between said transmitting means and said first set of GRIN lenses, a second group of optical fiber means coupled between said receiving means and said second set of GRIN rod lenses, and reflecting means positioned adjacent the last optical-tap means that is located along said transmitting path and the first beam-splitting, optical-tap means that is positioned along said receiving path for redirecting the light beam transmitted through the last beam-splitting, optical-tap means along said transmitting light path back through said same beam-splitting, optical-tap means in the opposite direction through said receiving light path.

2. An optical bus as claimed in claim 1 wherein each GRIN rod lens of said first set of GRIN rod lenses comprises, a first face that abuts said beam-splitting, optical-tap means and a second face, each GRIN rod lens of said second set of GRIN rod lenses comprises a first face that abuts said second face of one of said GRIN rod lenses of said first set of GRIN rod lenses and a second face which is coupled to the optical fiber means of either said first or second groups of optical fiber means, wherein said GRIN rod lenses of said first set of GRIN set lenses have a pitch of P(0.25) where P is an integer of at least 2, and said second GRIN rod lenses of said second set of GRIN rod lenses have a pitch of 0.25.

3. An optical bus as claimed in claim 1 wherein each GRIN rod lens of said first set of GRIN rod lenses comprises, a first face that abuts said beam-splitting, optical-tap means and a second face, and a second coupling GRIN rod lens that has a first face that abuts said second face of said first coupling GRIN rod lens and a second face, said GRIN rod lenses of said first and second sets of GRIN rod lenses each having a circular cross-section of a first diameter and an end face that is not secured to a beam-splitting, optical-tap, said optical bus further comprises at least one sub-set of GRIN rod lenses that each have a circular cross-section of a smaller second diameter than said first diameter such that a plurality of said sub-set of GRIN rod lenses will fit within the cross-section of a GRIN rod lenses of said first and second set of GRIN rod lenses, wherein at least selected ones of said end faces of said GRIN rod lens means of said first and second sets of GRIN rod lenses are each secured to a plurality of GRIN rod lenses of said sub-set of said GRIN rod lenses, and at least some of said transmitting and receiving means comprise multiple transmitting and receiving units and some of said optical fiber means of said first and second groups of optical fiber means are arranged so that each of said multiple transmitting and receiving units are coupled through a single optical fiber to one of said GRIN rod lenses of an associated sub-set of GRIN rod lenses.

4. An optical bus as claimed in claim 3 wherein each GRIN rod lens of said first set of GRIN rod lenses comprises, a first face that abuts said beam-splitting, optical-tap means and a second face, each GRIN rod lens of said second set of GRIN rod lenses comprises a first face that abuts said second face of one of said GRIN rod lenses of said first set of GRIN rod lenses and a second face which is coupled to the optical fiber means of either said first or second groups of optical fiber means, wherein said GRIN rod lenses of said first set of GRIN rod lenses have a pitch of P(0.25) where P is an integer of at least 2, and said second GRIN rod lenses of said second set of GRIN rod lenses have a pitch of 0.25.

5. An optical bus comprising:

a plurality of beam-splitting, optical-tap means constructed to allow a light beam to travel along a transmitting light path in a first direction through said optical-tap means, to travel along a receiving light path in the direction opposite to said first direction through said optical-tap means, to allow a portion of said light beam in said receiving light path to pass into an output light path that runs in a second direction which is substantially normal to said transmitting light path, and to allow an input light path that also runs in said second direction to provide a light beam to said transmitting light path, first plurality of GRIN rod lenses which are aligned along said transmitting light path, a second plurality of GRIN rod lenses which are aligned along said receiving light path which is substantially parallel to said transmitting light path, wherein said GRIN rod lenses of both said first and said second pluralities of GRIN rod lenses have first and second ends and each are positioned such that one of said beam-splitting, optical-tap means abuts said first end and another of said beam-splitting optical-tap means abuts said second end of each of said GRIN rod lenses, a plurality of receiving means and a plurality of transmitting means each of which are aligned with one said beam-splitting, optical-tap means, a first set of GRIN rod lenses each of which are associated with one of said receiving means, a second set of GRIN rod lenses each of which are associated with one of said transmitting means, each of said first and second sets of GRIN rod lenses being aligned with one of said beam-splitting, optical-tap means, and being positioned in abutment with the aligned one of said beam-splitting, optical-tap means such that light beams may pass through first set of said GRIN rod lens into said optical-tap means for transmission along said transmitting light path, and such that light may pass through optical-tap means into said receiving means through said second set of GRIN lens means, wherein said GRIN rod lenses of said first and second pluralities of said GRIN rod lenses have a pitch of m(0.5) where m is an integer, and said first and second sets of said GRIN rod lenses comprise GRIN rod lenses which have a pitch of n(0.25) wherein n is equal to 3 or greater, and said optical bus further comprises, a first group of optical fiber means coupled between said transmitting means and said first set of GRIN lenses, a second group of optical fiber means coupled between said receiving means and said second set of GRIN rod lenses, and redirection means optically coupled to said transmitting path and to said receiving path constructed to receive the light beam that is transmitted through said transmitting light path back and to redirect said beam through receiving light path.

6. An optical bus as claimed in claim 5 wherein each GRIN rod lens of said first set of GRIN rod lenses comprises,
- a first face that abuts said beam-splitting, optical-tap means and a second face,
- each GRIN rod lens of said second set of GRIN rod lenses comprises a first face that abuts said second face of one of said GRIN rod lenses of said first set of GRIN rod lenses and a second face which is coupled to the optical fiber means of either said fiber or second groups of optical fiber means,
- wherein said GRIN rod lenses of said first set of GRIN rod lenses have a pitch of P(0.25) where P is an integer of at least 2, and said second GRIN rod lenses of said second set of GRIN rod lenses have a pitch of 0.25.

7. An optical bus as claimed in claim 5 wherein each GRIN rod lens of said first set of GRIN rod lenses comprises,
- a first face that abuts said beam-splitting, optical-tap means and a second face, and a second coupling GRIN rod lens that has a first face that abuts said second face of said first coupling GRIN rod lens and a second face, said GRIN rod lenses of said first and second sets of GRIN rod lenses each having a circular cross-section of a first diameter and an end face that is not secured to a beam-splitting, optical-tap,
- said optical bus further comprises at least one sub-set of GRIN rod lenses that each have a circular cross-section of a smaller second diameter than said first diameter such that a plurality of said sub-set of GRIN rod lenses will fit within the cross-section of a GRIN rod lenses of said first and second set of GRIN rod lenses,
- wherein at least selected ones of said end faces of said GRIN rod lens means of said first and second sets of GRIN rod lenses are each secured to a plurality of GRIN rod lenses of said sub-set of said GRIN rod lenses, and at least some of said transmitting and receiving means comprise multiple transmitting and receiving units and some of said optical fiber means of said first and second groups of optical fiber means are arranged so that each of said multiple transmitting and receiving units are coupled through a single optical fiber to one of said GRIN rod lenses of an associated sub-set of GRIN rod lenses.

8. An optical bus as claimed in claim 7 wherein each GRIN rod lens of said first set of GRIN rod lenses comprises,
- a first face that abuts said beam-splitting, optical-tap means and a second face,
- each GRIN rod lens of said second set of GRIN rod lenses comprises a first face that abuts said second face of said of said GRIN rod lenses of said first set of GRIN rod lenses and a second face which is coupled to the optical fiber means of either said first or second groups of optical fiber means,
- wherein said GRIN rod lenses of said first set of GRIN rod lenses have a pitch of P(0.25) where P is an integer of at least 2, and said second GRIN rod lenses of said second set of GRIN rod lenses have a pitch of 0.25.

* * * * *

UNITED STATES PATENT AND TRADEMARK OFFICE
CERTIFICATE OF CORRECTION

PATENT NO. : 5,218,654
DATED : June 8, 1993
INVENTOR(S) : Gerald F. Sauter

It is certified that error appears in the above-identified patent and that said Letters Patent is hereby corrected as shown below:

Column 5, line 26, before "transmitter" insert -- transmitting light path from the transmitting units, such as the -- .

Signed and Sealed this

Eleventh Day of January, 1994

Attest:

BRUCE LEHMAN

Attesting Officer

Commissioner of Patents and Trademarks